United States Patent
Liu et al.

(10) Patent No.: US 9,401,821 B2
(45) Date of Patent: Jul. 26, 2016

(54) POWERED DEVICE, POWER SUPPLY SYSTEM, AND OPERATION MODE SELECTION METHOD

(71) Applicant: Alpha Networks Inc., Hsinchu (TW)

(72) Inventors: Yen-Hung Liu, Hsinchu (TW); An-Chang Hsu, Hsinchu (TW)

(73) Assignee: ALPHA NETWORKS INC., Hsinchu (TW)

( * ) Notice: Subject to any disclaimer, the term of this patent is extended or adjusted under 35 U.S.C. 154(b) by 177 days.

(21) Appl. No.: 14/300,749

(22) Filed: Jun. 10, 2014

(65) Prior Publication Data

US 2015/0026496 A1    Jan. 22, 2015

(30) Foreign Application Priority Data

Jul. 16, 2013    (TW) .............................. 102125372 A

(51) Int. Cl.
| | |
|---|---|
| G06F 1/32 | (2006.01) |
| H04L 12/64 | (2006.01) |
| G06F 1/26 | (2006.01) |
| H04L 12/10 | (2006.01) |
| H04L 12/40 | (2006.01) |

(52) U.S. Cl.
CPC ............ *H04L 12/6418* (2013.01); *G06F 1/266* (2013.01); *H04L 12/10* (2013.01); *H04L 12/40045* (2013.01)

(58) Field of Classification Search
CPC ......... G06F 1/26; G06F 1/266; G06F 1/3287; H04L 12/10; Y10T 307/414; Y02B 60/1282
USPC ........................................................ 713/323
See application file for complete search history.

(56) References Cited

U.S. PATENT DOCUMENTS

| | | | | |
|---|---|---|---|---|
| 7,996,698 | B2 * | 8/2011 | Nguyen .................. | G06F 11/30 713/300 |
| 8,225,124 | B2 * | 7/2012 | Geiger .................... | H04L 12/10 713/320 |
| 2008/0030185 | A1 * | 2/2008 | Metsker ................. | G06F 1/266 323/304 |
| 2008/0052546 | A1 | 2/2008 | Schindler et al. | |
| 2008/0168283 | A1 * | 7/2008 | Penning ................. | G06F 1/263 713/310 |

(Continued)

FOREIGN PATENT DOCUMENTS

CN             103107891        5/2013

OTHER PUBLICATIONS

Daniel Feldman et al., "Power Over Ethernet Plus," Version 2.0 Apr. 2008, pp. 1-6, Ethernet Alliance, www.ethernetalliance.org, Beaverton, OR.

(Continued)

*Primary Examiner* — Vincent Tran
(74) *Attorney, Agent, or Firm* — WPAT, PC; Justin King

(57) ABSTRACT

A powered device, a power supply system and an operation mode selection method are provided. The power supply system includes a power sourcing equipment and the powered device. The powered device is electrically connected to the power sourcing equipment through an internet cable. The powered device includes a sensing module and a controlling module. The sensing module receives an internet signal from the power sourcing equipment through the internet cable, and outputs a switching signal according to the internet signal. The controlling module is used for selecting an operation mode of the powered device according to the switching signal.

18 Claims, 5 Drawing Sheets

(56) References Cited

U.S. PATENT DOCUMENTS

| | | | |
|---|---|---|---|
| 2010/0106993 A1* | 4/2010 | Song | G03G 15/5004 713/323 |
| 2013/0124887 A1* | 5/2013 | Lee | G06F 1/3203 713/320 |
| 2013/0187632 A1* | 7/2013 | Ohana | H04L 12/10 324/103 R |
| 2014/0111030 A1* | 4/2014 | Chou | G05F 1/10 307/130 |
| 2014/0115313 A1* | 4/2014 | Chen | G06F 1/266 713/2 |
| 2015/0012769 A1* | 1/2015 | Koga | G06F 3/1218 713/323 |

OTHER PUBLICATIONS

Taiwan Intellectual Property Office, "Office Action," Apr. 21, 2015.

* cited by examiner

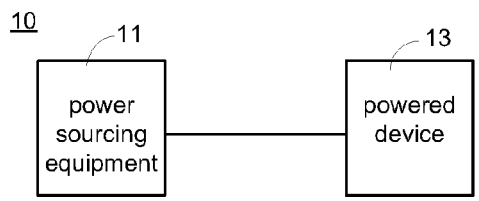
FIG. 1 (PRIOR ART)
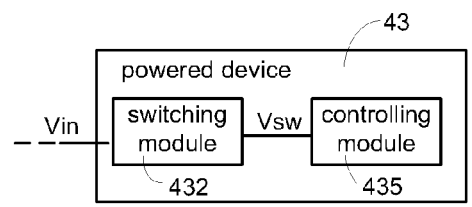
FIG. 3A
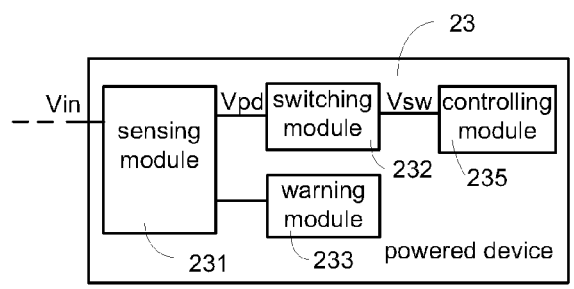
FIG. 3B
|  |  | powered device | |
|---|---|---|---|
|  |  | AF type | AT type |
| power sourcing equipment | AF type | normal | abnormal |
|  | AT type | normal | normal |
FIG. 2 (PRIOR ART)

POWERED DEVICE, POWER SUPPLY SYSTEM, AND OPERATION MODE SELECTION METHOD

This application claims the benefit of Taiwan Patent Application No. 102125372, filed Jul. 16, 2013, the subject matter of which is incorporated herein by reference.

FIELD OF THE INVENTION

The present invention relates to a powered device, a power supply system and an operation mode selection method, and more particularly to a powered device, a power supply system and an operation mode selection method according to a power over Ethernet technique.

BACKGROUND OF THE INVENTION

With increasing development of networking techniques, various Internet Protocol (hereinafter, IP) terminal devices such as IP phones, wireless access points or network video recorders become more and more popular.

As known, each of the IP terminal devices should be driven by electric power. However, if each of the IP terminal devices is equipped with a power cable, the wiring and connections of the power cables should be taken into consideration. That is, the use of the power cable is not convenient.

As the number of the IP terminal devices increases, the wiring process becomes more complicated because of the power requirements. For solving the above drawbacks, a power over Ethernet (hereinafter, POE) technique has been disclosed.

The POE technique can be used to transmit DC electric power to the IP terminal devices while transmitting data based on the Ethernet cabling architecture.

FIG. 1 is schematic functional block diagram illustrating the architecture of a conventional POE system. As shown in FIG. 1, the POE system 10 includes a power sourcing equipment (hereinafter, PSE) 11 and a powered device (hereinafter, PD) 13. For example, the powered device 13 is a general IP terminal device. The power sourcing equipment 11 is used for providing DC electric power to the powered device 13.

According to the power level, the power sourcing equipment 11 is usually classified into two types. In particular, the power sourcing equipment 11 complying with the IEEE 802.3af-2003 standard (also referred as an AF type) can provide 12.95 W of power, and the power sourcing equipment 11 complying with the IEEE 802.3at-2009 standard (also referred as an AT type) can provide 25.5 W of power.

Correspondingly, the powered device 13 is classified into two types. The AF type powered device 13 is operated in a relatively low power level mode, and the AT type powered device 13 is operated in a relatively high power level mode.

FIG. 2 is a table illustrating the relationship between the type of the power sourcing equipment and the type of the powered device. Each row indicates the type of the power sourcing equipment, and each column indicates the type of the powered device. In this table, an AF type power sourcing equipment and an AT type power sourcing equipment cooperate with an AF type powered device and an AT type powered device. Consequently, four powering situations are provided.

In a first situation, the AF type powered device and the AF type power sourcing equipment are included in the POE system. Since the power level provided by the power sourcing equipment and the power level required for the powered device are substantially identical, the powered device can be normally operated.

In a second situation, the AF type powered device and the AT type power sourcing equipment are included in the POE system. Since the power level provided by the power sourcing equipment is higher than the power level required for the powered device, the powered device can be normally operated.

In a third situation, the AT type powered device and the AF type power sourcing equipment are included in the POE system. Under this circumstance, the power level provided by the power sourcing equipment is lower than the power level required for the powered device. Since the power level provided by the power sourcing equipment is insufficient, the AT type powered device is possibly unable to be powered on, or repeatedly powered on and off, or suffered from power interruption in the usage state. That is, the powered device is abnormally operated.

In a fourth situation, the AT type powered device and the AT type power sourcing equipment are included in the POE system. Since the power level provided by the power sourcing equipment and the power level required for the powered device are substantially identical, the powered device can be normally operated.

From the above discussions about the conventional POE system, if the power level provided by the power sourcing equipment is lower than the power level required for the powered device, the powered device fails to be normally operated.

SUMMARY OF THE INVENTION

A first aspect of the present invention provides a powered device electrically connected to a power sourcing equipment through an internet cable. The powered device includes a sensing module and a controlling module. The sensing module receives an internet signal from the power sourcing equipment through the internet cable, and outputs a switching signal according to the internet signal. The controlling module is used for selecting an operation mode of the powered device according to the switching signal.

A second aspect of the present invention provides a power supply system. The power supply system includes a power sourcing equipment and a powered device. The powered device is electrically connected to the power sourcing equipment through an internet cable. The powered device includes a sensing module and a controlling module. The sensing module receives an internet signal from the power sourcing equipment through the internet cable, and outputs a switching signal according to the internet signal. The controlling module is used for selecting an operation mode of the powered device according to the switching signal.

A third aspect of the present invention provides an operation mode selection method for a powered device. The powered device is electrically connected to a power sourcing equipment through an internet cable. Firstly, an internet signal from the power sourcing equipment is received. Then, a type of the power sourcing equipment is judged according to the internet signal. If the power sourcing equipment provides a low power level, an operation mode of the powered device is selectively changed.

A fourth aspect of the present invention provides a powered device. The powered device is electrically connected to a power sourcing equipment through an internet cable. The powered device includes a switching module and a controlling module. The switching module generates a switching signal according to an adjusting operation. The controlling module is electrically connected to the switching module for selecting an operation mode according to the switching signal. The electric power required for the powered device in the operation mode is provided by the power sourcing equipment through the internet cable.

Numerous objects, features and advantages of the present invention will be readily apparent upon a reading of the following detailed description of embodiments of the present invention when taken in conjunction with the accompanying drawings. However, the drawings employed herein are for the purpose of descriptions and should not be regarded as limiting.

BRIEF DESCRIPTION OF THE DRAWINGS

The above objects and advantages of the present invention will become more readily apparent to those ordinarily skilled in the art after reviewing the following detailed description and accompanying drawings, in which:

FIG. 1 (prior art) is schematic functional block diagram illustrating the architecture of a conventional power over Ethernet (POE) system;

FIG. 2 (prior art) is a table illustrating the relationship between the type of the power sourcing equipment and the type of the powered device;

FIG. 3A is a schematic functional block diagram illustrating the architecture of an exemplary powered device used in the power supply system of the present invention;

FIG. 3B is a schematic functional block diagram illustrating the architecture of another exemplary powered device used in the power supply system of the present invention;

DETAILED DESCRIPTION OF PREFERRED EMBODIMENTS

Figure 4:
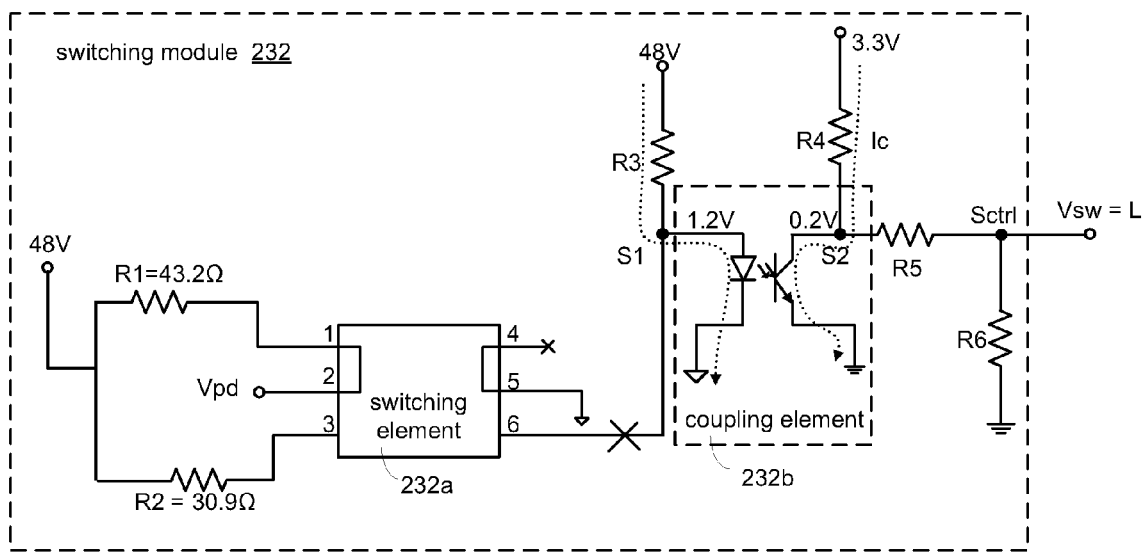
FIG. 4 is a schematic circuit diagram illustrating the operation of the switching module to generate the switching signal in response to the AF type power sourcing equipment.

The present invention provides a power supply system. The power supply system includes a power sourcing equipment and a powered device. The power sourcing equipment and the powered device are electrically connected with each other through Ethernet connection. Data and electric power can be transmitted over an Ethernet cable. The architecture of the power supply system of the present invention is substantially similar to that of the POE system as shown in FIG. 1. However, the operation mode of the powered device of the power supply system according to the present invention can be dynamically adjusted.

In accordance with the present invention, the powered device has improved functions. In this embodiment, the powered device has a function of sensing the type of the power sourcing equipment. More especially, according to the power level of the power sourcing equipment, the operation mode of the powered device may be switched between a high performance mode and a power-saving mode. The consumption power level in the high performance mode is higher than the consumption power level in the power-saving mode.

When the powered device senses and judges that the power sourcing equipment is the AT type power sourcing equipment, the powered device is set to operate in the high performance mode. Correspondingly, the powered device will operate according to the AT type standard.

For example, if the powered device is a wireless access point and the wireless access point judges that the power sourcing equipment is the AT type power sourcing equipment, the wireless access point uses a higher wireless RF output power level, a higher wireless output power level or a longer wireless transmission distance in order to provide more complete functions.

When the powered device senses and judges that the power sourcing equipment is the AF type power sourcing equipment, the powered device is set to operate in the power-saving mode. Correspondingly, the powered device will operate according to the AF type standard.

For example, if the powered device is a wireless access point and the wireless access point judges that the power sourcing equipment is the AF type power sourcing equipment, the wireless access point uses a lower wireless RF output power level, a lower wireless output power level or a lower current. For example, the number of transmission points provided by the wireless access point may be reduced from three to one.

FIG. 3A is a schematic functional block diagram illustrating the architecture of an exemplary powered device used in the power supply system of the present invention. The powered device 43 is electrically connected with the power sourcing equipment (not shown) through an internet cable (not shown). The powered device 43 includes a switching module 432 and a controlling module 435. According to the type of the power sourcing equipment, the switching module 432 may be controlled by an user to allow the powered device 43 to be selectively operated in the high performance mode or the power-saving mode. Generally, the consumption power level in the high performance mode is higher than the consumption power level in the power-saving mode.

If the default operation mode of the powered device 43 is the high performance mode but the AF type power sourcing equipment is connected with the powered device 43 through the internet cable, the settings of the switching module 432 may be adjusted in response to an adjusting operation of the user. That is, the operation mode can be manually adjusted by the user.

In response to the adjusting operation of the user, the switching module 432 generates a switching signal Vsw to the controlling module 435. In response to the switching signal Vsw, associated functional modules (not shown) of the powered device 43 are controlled by the controlling module 435. Under this circumstance, the operation mode of the powered device 43 is switched from the default high performance mode to the power-saving mode.

From the above discussions, if the default operation mode of the powered device 43 is the high performance mode but the power sourcing equipment is the AF type power sourcing equipment, the settings of the switching module 432 may be adjusted in response to the adjusting operation of the user. Consequently, the operation mode of the powered device 43 is switched to the power-saving mode. For example, the adjusting operation of the user includes a hardware switching operation or a software setting operation, but is not limited thereto.

In this embodiment, the switching module 432 includes a switching element (not shown) and a coupling element (not shown). In response to the adjusting operation of the user, the switching element is selectively in a first conducting state or a second conducting state. According to the conducting state of the switching element, the coupling element is selectively and electrically connected with the switching element. Consequently, a coupling current is selectively generated by the coupling element according to the electrical connection between the coupling element and the switching element. Moreover, the voltage level of the switching signal is determined according to the conducting state of the coupling element.

For example, when the switching element is in the first conducting state, the coupling current is generated by the coupling element, so that the switching signal is in a low-level state. Whereas, when the switching element is in the second conducting state, the coupling current is not generated by the coupling element, so that the switching signal is in a high-level state. The operations of the switching module 432 will be illustrated in more details later.

FIG. 3B is a schematic functional block diagram illustrating the architecture of another exemplary powered device used in the power supply system of the present invention. As shown in FIG. 3B, the powered device 23 includes a sensing module 231, a switching module 232, a controlling module 235, and a warning module 233.

The sensing module 231 is electrically connected with the power sourcing equipment (not shown) through Ethernet connection (i.e. internet cable). In addition, the sensing module 231 is also electrically connected with the switching module 232 and the warning module 233. The switching module 232 is further electrically connected with the controlling module 235.

An internet signal from the power sourcing equipment is received by the powered device 23 through the sensing module 231. Moreover, through the sensing module 231, the powered device 23 can automatically detect the operation mode of the power sourcing equipment.

More specifically, the sensing module 231 can judge the type of the power sourcing equipment by detecting whether a two-event classification (hereinafter, 2EC) signal is contained in the internet signal.

If the internet signal contains the 2EC signal, the powered device 23 may consequently judges that the power sourcing equipment is the AT type power sourcing equipment. Whereas, if the internet signal does not contain the 2EC signal, the powered device 23 may judge that the power sourcing equipment is the AF type power sourcing equipment.

After the type of the power sourcing equipment is judged by the sensing module 231, the warning module 233 may prompt the user about the compatibility between the power sourcing equipment and the powered device 23. The warning module 233 may prompt the user through light, sound or prompt message.

For example, the warning message is the light. Color of the light represents whether the powered device (PD) 23 and the power sourcing equipment (PSE) are compatible. The green light from the warning module 233 indicates that the powered device (PD) 23 is normally operated, and the red light from the warning module 233 indicates that the powered device (PD) 23 is abnormally operated. If the warning module 233 generates the red light, the user may realize that the electric power provided by the power sourcing equipment is insufficient for normal operation of the powered device 23.

Similarly, the warning module 233 may notify the user that the powered device 23 is abnormally operated through hurried sound or prompt message.

Moreover, in response to the adjusting operation of the user, the settings of the switching module 232 may be adjusted. Consequently, the switching signal Vsw generated by the switching module 232 is changed. The adjusting operation of the user includes a hardware switching operation or a software setting operation. After the switching signal Vsw is transmitted from the switching module 232 to the controlling module 235, associated functional modules (not shown) of the powered device 23 are controlled by the controlling module 235 to be operated in the corresponding operation mode.

After the operation mode of the powered device 23 is changed, the powered device 23 can be normally operated. Consequently, the warning module 233 stops generating the warning message.

As mentioned above, the powered device may be an IP phone, a wireless access point or a network video recorder. According to the type of the powered device 23, associated functional modules (not shown) of the powered device 23 are controlled by the controlling module 235 to be operated in the high performance mode or the power-saving mode.

Figure 5:
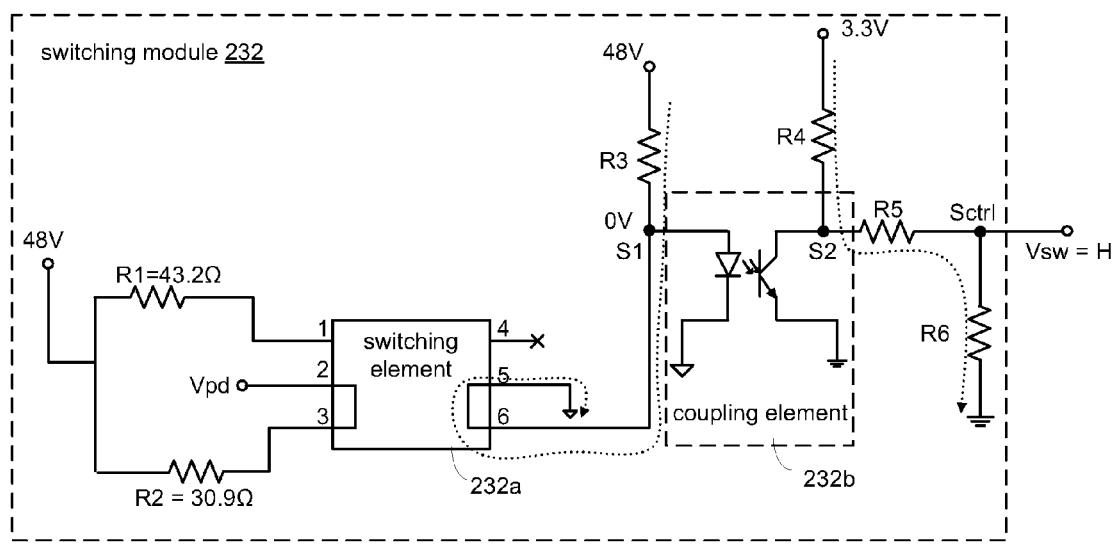
FIG. 5 is a schematic circuit diagram illustrating the operation of the switching module to generate the switching signal in response to the AT type power sourcing equipment.

Hereinafter, the operations of the switching module 232 will be illustrated with reference to FIGS. 4 and 5. FIG. 4 is a schematic circuit diagram illustrating the operation of the switching module to generate the switching signal in response to the AF type power sourcing equipment. FIG. 5 is a schematic circuit diagram illustrating the operation of the switching module to generate the switching signal in response to the AT type power sourcing equipment.

The operations of the switching module 232 as shown in FIGS. 4 and 5 are presented herein for purpose of illustration and description only. Moreover, the relationships between the voltage level of the switching signal from the switching module 232 and the type of the power sourcing equipment are not restricted.

The operations of the switching module 232 as shown in FIG. 4 indicate that the internet signal does not contain the 2EC signal. As shown in FIG. 4, the switching module 232 includes a switching element 232a, a coupling element 232b, and plural resistors R1, R2, R3, R4, R5 and R6.

The switching element 232a may be selectively in a first conducting state or a second conducting state. In the first conducting state, a first pin and a second pin of the switching element 232a are connected with each other, and a fourth pin and a fifth pin of the switching element 232a are connected with each other (see FIG. 4). In the second conducting state, the second pin and a third pin of the switching element 232a are connected with each other, and the fifth pin and a sixth pin of the switching element 232a are connected with each other (see FIG. 5).

The first pin of the switching element 232a is connected to a power source voltage 48V (i.e. the internet signal Vin) through the first resistor R1. The third pin of the switching element 232a is connected to the power source voltage 48V through the second resistor R2. The second pin of the switching element 232a is connected to an input module (not shown) for receiving a supply voltage Vpd. The way of generating the supply voltage Vpd is not restricted. For example, in an embodiment, the internet signal Vin may be converted into the supply voltage Vpd by the input module. The position of the input module is not restricted.

For example, if the input module is disposed within the switching module, the processes of converting the internet signal Vin into the supply voltage Vpd and outputting the switching signal Vsw according to the supply voltage Vpd may be implemented in the switching module. This method may be applied to the architecture of FIG. 3A.

Moreover, if the input module is disposed within the sensing module, the internet signal Vin may be converted into the supply voltage Vpd by the sensing module, and then the switching signal Vsw is outputted from the switching module 232 according to the supply voltage Vpd. This method may be applied to the architecture of FIG. 3B. Hereinafter, the present invention will be illustrated by referring to the switching module of the powered device of FIG. 3B.

The fourth pin of the switching element 232a is a no connection pin, and the fifth pin of the switching element 232a is a ground pin. The sixth pin of the switching element 232a, the coupling element 232b and the third resistor R3 are electrically connected to a first node S1.

An example of the coupling element 232b includes but is not limited to an optical coupler. The left side of the coupling element 232b is an input side, and the right side of the coupling element 232b is an output side. The coupling element 232b has a good isolation function. Thus, the received voltage at the left side and the working voltage at the right side are isolated. Consequently, components at the left side of the coupling element 232b are operated at a higher voltage (e.g. 48V), and components at the right side of the coupling element 232b are operated at a lower voltage (e.g. 3.3V).

The left side of the coupling element 232b is electrically connected to the third resistor R3 and a ground voltage (0 volt), and the right side of the coupling element 232b is electrically connected to the fourth resistor R4 and the ground voltage.

The third resistor R3 is electrically connected between the power source voltage (48V) and the first node S1. The fourth resistor R4 is electrically connected with the voltage 3.3V and a second node S2. The fifth resistor R5 is electrically connected between the second node S2 and a control node Sctrl. The sixth resistor R6 is electrically connected between the control node Sctrl and the ground voltage.

In case that the supply voltage Vpd is an AF type supply voltage, the switching element 232a is in the first conducting state.

As shown in FIG. 4, the sixth pin of the switching element 232a is in a floating state (i.e. a no connection state). Consequently, the power source voltage 48V is conducted to the ground voltage through the third resistor R3 and the left side of the coupling element 232b. Since the left side of the coupling element 232b is connected to the ground voltage through a light emitting diode, the voltage at the first node S1 is about 1.2V.

When a forward bias voltage is generated at the left side of the coupling element 232b, the light beam from the light emitting diode strikes a base of an optical transistor at the right side of the coupling element 232b. Consequently, a collector current Ic is generated. Under this circumstance, the optical transistor at the right side of the coupling element 232b is turned on.

Since the optical transistor at the right side of the coupling element 232b is turned on, a coupling current flows from the voltage 3.3V to the ground terminal through the fourth resistor R4. Meanwhile, the switching signal Vsw between the fifth resistor R5 and the sixth resistor R6 is in a low-level state.

In other words, when the switching element 232a is in the first conducting state, the coupling current is generated by the coupling element 232b. Correspondingly, the coupling element 232b and the connected fourth resistor R4 conduct voltage of the switching signal Vsw to the low-level state.

The operations of the switching module 232 as shown in FIG. 5 indicate that the internet signal contains the 2EC signal. In the second conducting state, the internet signal is the AT type internet signal. The second pin and the third pin of the switching element 232a are connected with each other, and the fifth pin and the sixth pin of the switching element 232a are connected with each other.

As shown in FIG. 5, the sixth pin of the switching element 232a is connected to the ground terminal through the fifth pin. Consequently, the power source voltage 48V is conducted to the ground voltage through the third resistor R3 and the sixth pin and the fifth pin of the switching element 232a. Consequently, the voltage at the first node S1 is equal to the ground voltage (0V).

Meanwhile, the light emitting diode at the left side of the coupling element 232b is turned off. Correspondingly, the optical transistor at the right side of the coupling element 232b is also turned off (becomes open circuit).

Since the optical transistor at the right side of the coupling element 232b is turned off, a generated current flows from the voltage 3.3V to the ground terminal through the fourth resistor R4, the fifth resistor R5 and the sixth resistor R6. Meanwhile, the switching signal Vsw between the fifth resistor R5 and the sixth resistor R6 is in a high-level state.

In other words, when the switching element 232a is in the second conducting state, the coupling element 232b does not generate coupling current flowing to the ground terminal. Under this circumstance, the voltage of the switching signal Vsw is determined by the fourth resistor R4, the fifth resistor R5 and the sixth resistor R6. Combination of these resistors becomes a division circuit, and the voltage of the switching signal Vsw is equal to 3.3V. Correspondingly, the switching signal Vsw is in the high-level state.

From the above discussions about the operations of the switching module 235a of FIGS. 4 and 5, the voltage at the first node S1 is in the high-level state or the low-level state according to the type of the power sourcing equipment. Consequently, the voltage level of the switching signal Vsw at the right side of the coupling element 232b is correspondingly changed.

In other words, the coupling element 232b is used for transferring the high-level state or the low-level state at the left side to the switching signal Vsw at the right side. In case that the controlling module 235 is a central processing unit (hereinafter, CPU), the control node Sctrl may be electrically connected to a general purpose I/O (hereinafter, GPIO) pin of the CPU. In order to retrieve actual voltage of the control node Sctrl, the CPU may set the GPIO as an input pin. If the CPU judges that the GPIO pin of the CPU is in the low-level state, the operation mode of the powered device is automatically switched to the power-saving mode. Whereas, if the CPU judges that the GPIO pin of the CPU is in the high-level state, the operation mode of the powered device is automatically switched to the high performance mode.

After the switching signal Vsw is received by the controlling module 235, the controlling module 235 may judge whether the maximum power level provided by the power sourcing equipment is 12.95 W or 25.5 W according to the voltage level of the switching signal Vsw (high-level state or low-level state). That is, according to the powering characteristics of the power sourcing equipment, the load characteristics of the powered device 23 is optimized by the controlling module 235.

After the internet signal is transmitted from the power sourcing equipment to the sensing module 231 through Ethernet connection, the sensing module 231 will judge whether the two-event classification (2EC) signal is contained in the internet signal. In addition, the sensing module 231 generates the supply voltage Vpd to the switching module 232. Then, the switching module 232 outputs the switching signal Vsw to the controlling module 235. According to the voltage level of the switching signal Vsw, the operation mode of the powered device 23 is adjusted by the controlling module 235.

In case that the switching signal Vsw is in the low-level state, the powered device 23 is controlled by the controlling module 235 to be operated in a low power level mode (e.g. the power-saving mode such as the AF mode). Under this circumstance, the powered device 23 judges that the maximum power level provided by the power sourcing equipment is 12.95 W. Consequently, the powered device 23 is automatically adjusted to consume a lower RF output power level.

In case that the switching signal Vsw is in the high-level state, the powered device 23 is controlled by the controlling module 235 to be operated in a high power level mode (e.g. the high performance mode such as the AT mode). Under this circumstance, the powered device 23 judges that the maximum power level provided by the power sourcing equipment is 25.5 W. Consequently, the powered device 23 is automatically adjusted to consume a higher RF output power level.

It is noted that the definitions of the voltage level of the switching signal Vsw corresponding to the operation mode may be changed according to the practical requirements. For example, in some embodiments, the powered device 23 is controlled by the controlling module 235 to be operated in a low power level mode (e.g. the AF mode) when the switching signal Vsw is in the high-level state, and the powered device 23 is controlled by the controlling module 235 to be operated in a high power level mode (e.g. the AF mode) when the switching signal Vsw is in the low-level state. Alternatively, in some other embodiments, a specified voltage level change of the switching signal Vsw indicates the AF mode or the AT mode.

In the above embodiment as shown in FIGS. 4 and 5, the switching module 232 is a physical switch. Alternatively, in some other embodiments, the switching module 232 may be implemented by a software setting component. The principles of the switching module 232 implemented by the software component are well known to those skilled in the art, and are not redundantly described herein.

Figure 6:
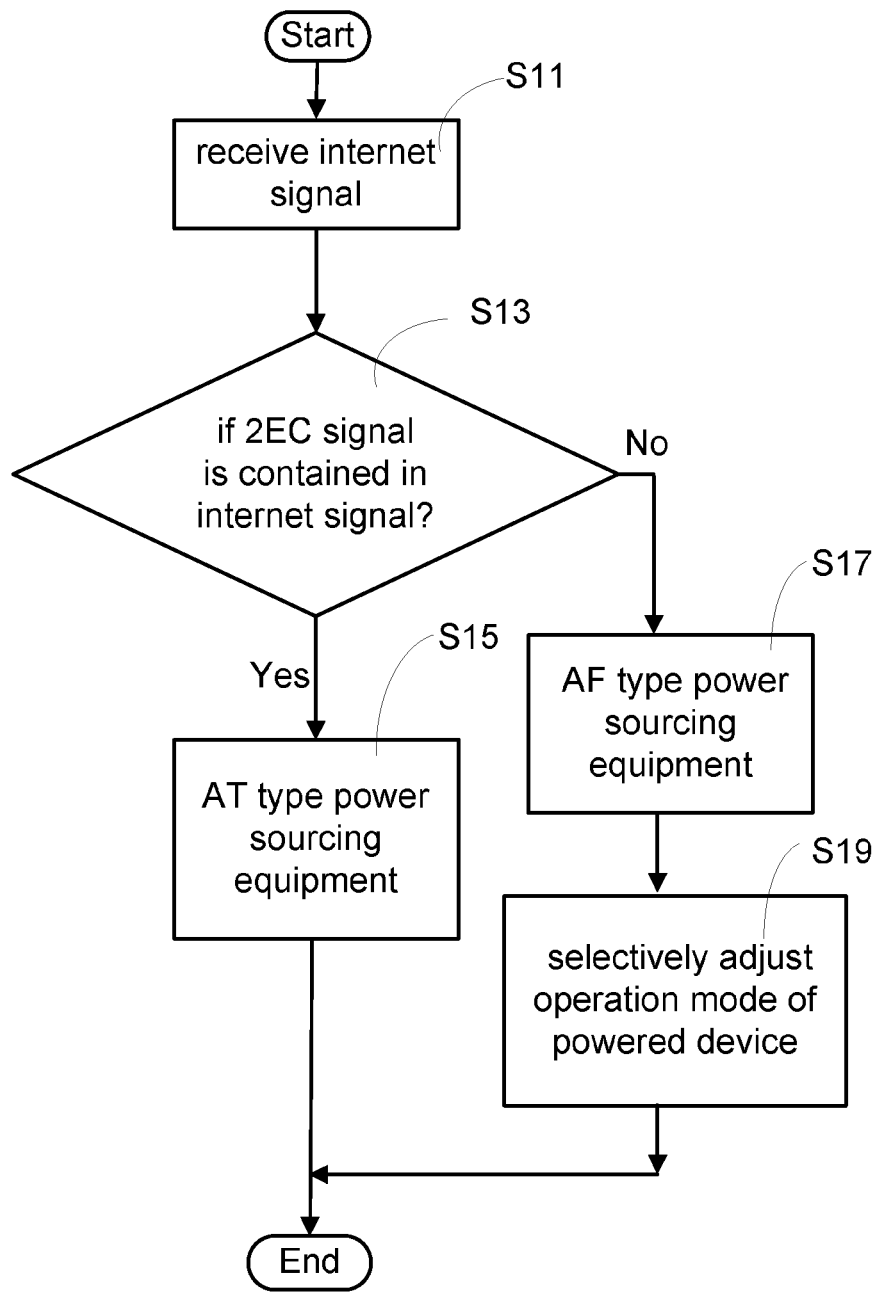
FIG. 6 is a flowchart illustrating a method of judging the type of the power sourcing equipment by the powered device according to the internet signal.

FIG. 6 is a flowchart illustrating a method of judging the type of the power sourcing equipment by the powered device according to the internet signal. Firstly, the internet signal is received by the sensing module of the powered device (Step S11). Then, the sensing module judges whether a 2EC signal is contained in the internet signal (Step S13).

If the judging condition of the step S13 is satisfied, it is determined that the power sourcing equipment is an AT type power sourcing equipment (Step S15). Since the power sourcing equipment is the AT type power sourcing equipment, the AT type powered device or the AF type powered device can be normally operated. Under this circumstance, it is not necessary to change the operation mode of the powered device.

If the judging condition of the step S13 is not satisfied, it is determined that the power sourcing equipment is an AF type power sourcing equipment (Step S17), and the operation mode of the powered device is selectively adjusted (Step S19).

The step S19 will be further illustrated with reference to the flowchart of FIG. 7.

Figure 7:
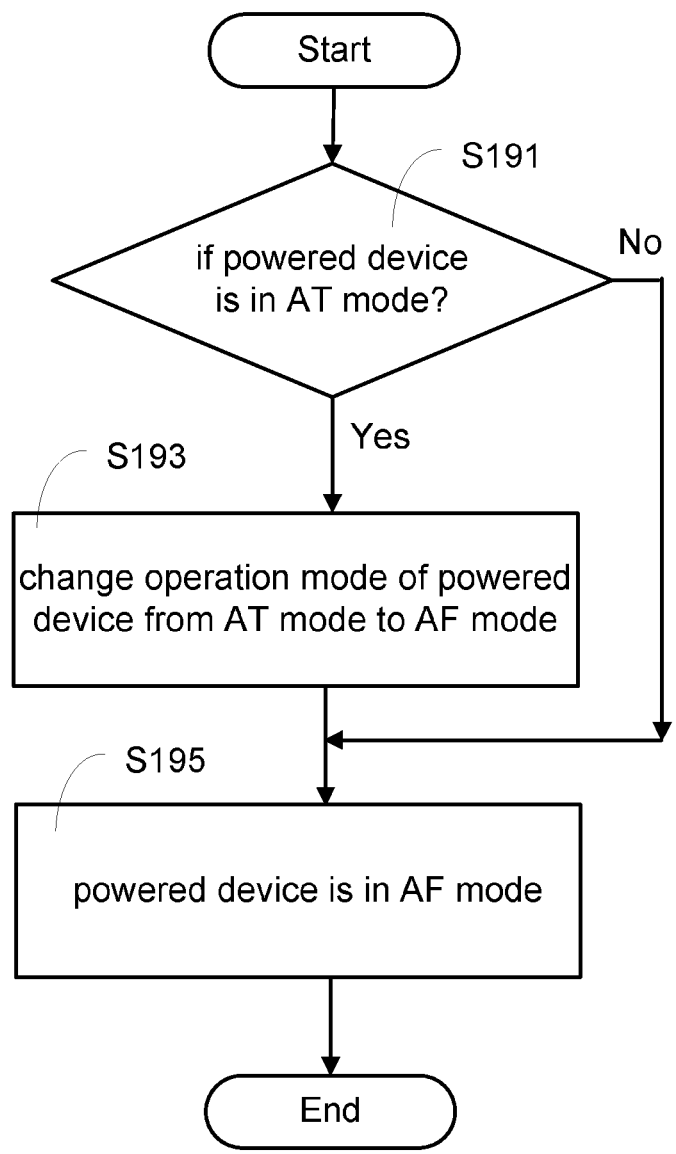
FIG. 7 is a flowchart illustrating a method of selecting an operation mode of the powered device after an AF type power sourcing equipment is detected.

FIG. 7 is a flowchart illustrating a method of selecting an operation mode of the powered device after an AF type power sourcing equipment is detected. Firstly, the step S191 is performed to judge whether the powered device is operated in an AT mode. If the judging condition of the step S191 is not satisfied, the operation mode of the powered device is maintained in the AF mode (Step S195).

Whereas, if the judging condition of the step S191 is satisfied, the operation mode of the powered device is switched from the AT mode to the AF mode (Step S193), and the powered device starts to operate in the AF mode (Step S195).

From the above descriptions, the powered device of the present invention has the function of sensing the type of the power sourcing equipment. Once the power level provided by the power sourcing equipment is lowered than the required power level, the powered device may issue a warning message. According to the warning message and an adjusting operation of the user, the operation mode of the powered device is adjusted.

The powered device of the present invention has the function of automatically sensing the type of the power sourcing equipment. Moreover, the present invention also provides a humanized software operation interface and a humanized hardware switching element for allowing the user to manually change the operation mode of the powered device. By using the powered device of the present invention, the process of constructing the power over Ethernet (POE) system is largely simplified.

While the invention has been described in terms of what is presently considered to be the most practical and preferred embodiments, it is to be understood that the invention needs not be limited to the disclosed embodiment. On the contrary, it is intended to cover various modifications and similar arrangements included within the spirit and scope of the appended claims which are to be accorded with the broadest interpretation so as to encompass all such modifications and similar structures.

What is claimed is:

1. A powered device, electrically connected to a power sourcing equipment through an internet cable, comprising:
   a sensing module, for receiving an internet signal from the power sourcing equipment through the internet cable, and outputting a switching signal according to the internet signal;
   a controlling module, for selecting an operation mode of the powered device according to the switching signal; and
   a switching module, electrically connected to the sensing module and the controlling module, for generating the switching signal according to the internet signal and an adjusting operation by a user.

2. The powered device as claimed in claim 1, wherein the operation mode is a high performance mode or a power-saving mode.

3. The powered device as claimed in claim 2, wherein if a two-event classification (2EC) signal is contained in the internet signal, the high performance mode is selected as the operation mode by the controlling module.

4. The powered device as claimed in claim 2, wherein if the two-event classification (2EC) signal is not contained in the internet signal, the power-saving mode is selected as the operation mode by the controlling module.

5. The powered device as claimed in claim 1, further comprising a warning module, electrically connected to the sensing module, for generating a warning message according to the internet signal.

6. The powered device as claimed in claim 5, wherein the adjusting operation is a hardware switching operation or a software setting operation, and the adjusting operation is performed by the user according to the warning message.

7. The powered device as claimed in claim 1, wherein the switching module comprises:
   a switching element, selectively operating in a first conducting state or a second conducting state in response to the adjusting operation; and
   a coupling element, selectively connected with the switching element according to the first conducting state or the second conducting state of the switching element, thereby selectively generating a coupling current.

8. A power supply system, comprising: a power sourcing equipment; and
   a powered device, electrically connected to the power sourcing equipment through an internet cable, comprising:
   a sensing module, for receiving an internet signal from the power sourcing equipment through the internet cable, and outputting a switching signal according to the internet signal;
   a controlling module, for selecting an operation mode of the powered device according to the switching signal; and
   a switching module, electrically connected to the sensing module and the controlling module, for generating the switching signal according to the internet signal and an adjusting operation by a user.

9. The power supply system as claimed in claim 8, wherein the operation mode is a high performance mode or a power-saving mode, wherein a consumption power level in the high performance mode is higher than a consumption power level in the power-saving mode.

10. The power supply system as claimed in claim 9, wherein if a two-event classification (2EC) signal is contained in the internet signal, the high performance mode is selected as the operation mode by the controlling module.

11. The power supply system as claimed in claim 9, wherein if the two-event classification (2EC) signal is not contained in the internet signal, the power-saving mode is selected as the operation mode by the controlling module.

12. The power supply system as claimed in claim 8, further comprising a warning module, electrically connected to the sensing module, for generating a warning message according to the internet signal.

13. The power supply system as claimed in claim 12, wherein the adjusting operation is a hardware switching operation or a software setting operation, and the adjusting operation is performed by the user according to the warning message.

14. An operation mode selection method for a powered device, wherein the powered device is electrically connected to a power sourcing equipment through an internet cable, the operation mode selection method comprising steps of:
   receiving an internet signal from the power sourcing equipment;
   judging a type of the power sourcing equipment according to the internet signal; and the powered device selectively generating a switching signal and changing an operation mode in response to the internet signal and an adjusting operation by a user if the power sourcing equipment provides a low power level.

15. The operation mode selection method as claimed in claim 14, wherein the step of the powered device selectively changing the operation mode comprises sub-steps of:
   judging the operation mode of the powered device; and
   if the powered device is in a high performance mode, the operation mode of the powered device is changed to a power-saving mode.

16. A powered device, electrically connected to a power sourcing equipment through an internet cable, comprising:
   a switching module, for generating a switching signal according to an internet signal and an adjusting operation by a user, wherein the internet signal is received from the power sourcing equipment through the internet cable; and
   a controlling module, electrically connected to the switching module, for selecting an operation mode according to the switching signal, wherein electric power required for the powered device in the operation mode is provided by the power sourcing equipment through the internet cable.

17. The powered device as claimed in claim 16, wherein the adjusting operation is a hardware switching operation or a software setting operation.

18. The powered device as claimed in claim 16, wherein the switching module comprises:
   a switching element, for selectively operating in a first conducting state or a second conducting state in response to the adjusting operation; and
   a coupling element, selectively connected with the switching element according to the first conducting state or the second conducting state of the switching element, thereby selectively generating a coupling current.

* * * * *